United States Patent [19]
Schug et al.

[11] Patent Number: 5,750,961
[45] Date of Patent: May 12, 1998

[54] METHOD FOR CONTROLLING THE ACTUAL TEMPERATURE OF AN INTERMITTENTLY OPERATED HEATING MEANS, PARTICULARLY OF AN ELECTRIC HEATING MEANS

[75] Inventors: Heinrich Schug; Reiner Schlickhoff; Reinhold Pieper, all of North-Rhine Westphalia, Germany

[73] Assignee: Imation Corp., Oakdale, Minn.

[21] Appl. No.: 515,121

[22] Filed: Aug. 15, 1995

[30]     Foreign Application Priority Data

Oct. 19, 1994 [DE] Germany ............... 44 37 373.2

[51] Int. Cl.⁶ .................................................. H05B 1/02
[52] U.S. Cl. .......................... 219/497; 219/501; 219/492; 374/102; 323/236
[58] Field of Search ............................. 219/494, 492, 219/497, 499, 501, 505, 508; 323/235, 236, 319; 374/102, 103

[56]              References Cited

U.S. PATENT DOCUMENTS

| | | | |
|---|---|---|---|
| 3,961,236 | 6/1976 | Rodek et al. | 219/497 |
| 4,053,733 | 10/1977 | Murata et al. | 219/494 |
| 4,377,138 | 3/1983 | Mitani et al. | 219/497 |
| 4,523,084 | 6/1985 | Tamura et al. | 219/497 |
| 4,549,073 | 10/1985 | Tamura et al. | 219/497 |
| 4,607,962 | 8/1986 | Nagao et al. | 374/103 |
| 4,820,904 | 4/1989 | Urban | 219/216 |
| 4,858,576 | 8/1989 | Jeffries et al. | 219/497 |
| 4,868,368 | 9/1989 | Araki | 219/216 |
| 4,962,300 | 10/1990 | Watanabe | 219/497 |
| 5,141,333 | 8/1992 | Ndebi et al. | 374/153 |
| 5,191,381 | 3/1993 | Yuan | 355/285 |
| 5,208,607 | 5/1993 | Ohashi et al. | 346/1.1 |

FOREIGN PATENT DOCUMENTS

| | | |
|---|---|---|
| 0 042 344 | 12/1981 | European Pat. Off. . |
| 0 208 256 | 1/1987 | European Pat. Off. . |
| 0 241 714 | 10/1987 | European Pat. Off. . |
| 0 333 916 | 9/1989 | European Pat. Off. . |
| 0 418 089 | 3/1991 | European Pat. Off. . |
| 0 515 299 | 11/1992 | European Pat. Off. . |
| 0 564 420 | 10/1993 | European Pat. Off. . |
| 2 508 902 | 9/1975 | Germany . |
| 3 131 799 | 4/1983 | Germany . |
| 3 309 398 | 9/1984 | Germany . |
| 3 500 557 | 7/1986 | Germany . |

*Primary Examiner*—Mark H. Paschall
*Attorney, Agent, or Firm*—Kent J. Sieffert

[57]              ABSTRACT

In a method for controlling the actual temperature of an intermittently operated heating means, at least one operating parameter is measured for a predetermined measuring time period (T) during a switch-on interval (86) of the heating means. On the basis of the measured value of the at least one operating parameter, the actual temperature of the heating element is detected. The length of the current switch-on interval (86) is changed in dependence on the result of a comparison between the actual temperature and a predetermined desired temperature. The minimum length of each switch-on interval (86) is equal to the measuring time period (T). The measuring time period (T) is selected to provide that, during the length of the measuring time period (T), the thermal energy supplied to the heating means is less than the thermal energy emitted during the following switch-off interval (88) extending up to the next switch-on interval (86).

9 Claims, 5 Drawing Sheets

METHOD FOR CONTROLLING THE ACTUAL TEMPERATURE OF AN INTERMITTENTLY OPERATED HEATING MEANS, PARTICULARLY OF AN ELECTRIC HEATING MEANS

FIELD OF THE INVENTION

The invention is directed to a method for controlling the actual temperature of an intermittently operated heating means, particularly of an electric heating means. More specifically, the invention is directed to a method for controlling the temperature of a surface heatable by a heating means and provided for heat treatment of an element, particularly a lamellar element.

DISCUSSION OF RELATED ART

In a wide range of treatment processes, an element to be subjected to heat treatment is exposed to a heating means or a treatment device heated by said heating means and/or is brought into pressure contact with a heatable surface of said treatment device. Examples of such processes are heater fixing stations in (electrophotographic) copying machines, wherein the toner image is fixed on the copying sheet by "burning" the toner particles into the sheet. A further example is a laminating device in which a film is laminated onto a carrier by heat and pressure. Such laminating devices are used, e.g., for color proofing systems in the field of graphic reproduction and printing, where the laminating device is used for laminating a layer attached on a carrier film and comprising a visible light absorbing composition such as color particles or the like, onto the proof (e.g., a sheet of paper material). The adhesive strength of the visible light absorbing composition on the proof and the homogeneity of the adhesion will depend not only on the pressure of the laminating rollers but also on the (absolute) temperature of the two laminating rollers and the stability of the temperature during the laminating process.

Presently, particularly in heater fixing stations, heating means are designed as thin layers of ceramic materials which upon application of an operating voltage have an operating current flowing there-through and are heated because of their ohmic resistance. The ceramic layer is arranged on the peripheral surface of a carrier roller and has an outer layer of an elastic material, e.g., a silicone rubber, arranged thereon. Often, a further layer is arranged between the ceramic layer and the carrier roller for thermal insulation. Examples of heater rollers provided with a ceramic layer for a heating means or element are disclosed in DE-A-25 08 902, DE-A-31 31 799, DE-A-33 09 398, DE-A-35 00 557, EP-A-0 241 714, EP-A-0 515 299, U.S. Pat. Nos. 4,820,904, 5,141,333 and 5,191,381.

Generally, when heating a heating roller, the heating means is switched on in switch-on intervals and is switched off in switch-off intervals. The heating power of the switched-on heating means is substantially constant so that the heating energy emitted per switch-on interval depends on the length of the interval. The length of the switch-on interval is set in dependence on the actual temperature of the heating means or the actual temperature of the heated surface.

A certain weak point in temperature control or regulation resides in the sensing of the actual temperature by a measuring technique. This is because the sensor element used for that purpose delivers a value which is offset relative to the real actual temperature. Further, the space requirements for accommodating the sensor can cause problems.

In existing temperature control or regulation, as disclosed in U.S. Pat. Nos. 4,053,733, 4,868,368, EP-A-0 042 344, EP-A-0 208 256, EP-A-0 418 089 and EP-A-0 564 420, pulse-width-controlled heating and/or temperature measurement by temperature sensors are performed. Further, U.S. Pat. Nos. 4,523,084, 4,549,073 and EP-A-0 333 916 disclose methods to be used in electrical resistance heating conductors to detect the ohmic resistance and, on this basis, the temperature of the resistance heating conductor.

SUMMARY OF THE INVENTION

It is an aspect of the invention to provide a temperature control method of the above mentioned type wherein the actual temperature is detected in a simple manner without using a sensor.

According to a first variant of the invention, a method is described for controlling the actual temperature of an intermittently operated heating means which is switched on in switch-on intervals while being operated by use of at least one operating parameter determining the heating power and being measurable during operation, and which is switched off in switch-off intervals between successive switch-on intervals, with the length of the switch-on interval being changed in dependence on the actual temperature of the heating means. According to the method of the invention, it is provided that during a switch-on interval, the at least one operating parameter is measured for a predetermined measuring time period, the actual temperature of the heating means is detected on the basis of a measured value of the at least one operating parameter and the length of the current switch-on interval is changed in dependence on the result of a comparison between the actual temperature and a predetermined desired temperature, wherein the minimum length of each switch-on interval is equal to the measuring time period.

According to the method of the invention, control of the actual temperature is performed by variation of the length of the switch-on intervals during which the heating means is in the switched-on condition and emits heating energy. During a switch-off interval between two successive switch-on intervals, the heating means is in the switched-off condition. The actual temperature of the heating means (in the case of a resistance heating conductor, this will be the temperature of the resistance heating conductor) is detected on the basis of at least one of the operating parameters characterizing the operating condition of the heating means within the switch-on intervals. Provided that the interdependency between the heating power of the heating means and the amount and sign of the at least one operating parameter is known, the actual temperature can be derived.

The inventive method makes it possible to detect the temperature of the heating means or of an element heated thereby without the need for separate sensors. In this manner, the problem of a possible inaccurate measurement due to offset of the sensor is eliminated. Further, the driving of the heating means for detection of the actual temperature can be performed very easily because this driving procedure is by no means different from the driving of the heating means as required for heating.

In principle, it would be possible to perform the detection of the actual temperature by driving the heating means in a manner which is different from the (operating) parameters of the heating means during the heating operation. Also in this case, a separate sensor could be dispensed. However, this advantage would entail the disadvantage that a switching would have to be performed between measuring operation and heating operation, i.e. between measuring intervals, switch-on intervals and switch-off intervals, thus making the driving process more complicated. The advantage of the inventive method is useful especially in those heating means which, for heating, are driven constantly (plus-width-controlled heating means), wherein the temperature can be controlled by the length of the driving or by the pulse/pause ratio. The operating parameters include at least one operating parameter which is set in dependence on the actual temperature of the heating means while the other operating parameters remain constant. The operating parameters of the heating means can also be regarded as the input amount of the heating means while the temperature of the heating means is the output amount of the heating means. If this output amount determines at least one of the input amounts, the temperature of such a heating means can be detected by measuring said at least one input amount or on the basis of the measured value for this input amount.

Detection of the actual temperature or of a value representing the actual temperature requires a minimum length of time which will referred to as the measuring time period hereunder. Since the heating means will be switched into the heating mode also for detection of the actual temperature (as explained above, the measured operating parameters or at least one of them are used for detecting the actual temperature), this may undesirably cause an increase of the actual temperature of the heating means. Thus, according to a preferred embodiment of the invention, overheating of the heating means or heat-up of the heating means is prevented if the heating means in one or a plurality of successive switch-on intervals is each time switched on only for the length of the measuring time period. Thereby, a precaution is made to the effect that the heating means—or an element heated by the heating means for heat treatment—in the subsequent switch-off phase can cool down by a temperature difference which is larger than the difference by which the heating means or the element has been heated up within the measuring time period. In other words, the intermittent control of the heating means is suitably performed in such a manner that, when a switch-on interval is equal to the measuring time period, the thermal energy emitted by the heating means or by the heated element during the subsequent switch-off interval will be larger than the thermal energy which previously has been supplied within the measuring time period. Thus, the minimum length of a switch-on interval is preferably selected to be identical with the measuring time period, so that, during the length of the measuring time period, the thermal energy supplied to the heating means is inferior to the thermal energy emitted during the following switch-off interval extending up to the next switch-on interval.

The relationship between the energy and power supplied to the heating means (in the switched-on condition), and the thermal energy and power emitted must be determined on a case-by-case basis. As the design of the heating means, its composition, and its relationship to the remainder of the system or its environment (e.g., amount of space and separation between the heating means and other portions of the apparatus) can affect this energy and power relationship, each apparatus and heating means must be evaluated. To determine limits on the energy and power to be supplied or emitted, actual physical/electrical measurements should be made to predetermine the appropriate energy and power supply levels. When it has been detected which maximum energy/power is supplied to the heating means and which minimum energy/power is emitted by the heating means in the switched-on condition, and which minimum energy/power is emitted by the heating means in the switched-off condition, the minimum length of the switch-off interval can be determined so that, when operating the heating means only for the measuring time period, more thermal energy is emitted in the subsequent switch-off interval than has been supplied in the measuring time period, under consideration of the energy emitted also during this period (difference between the energy supplied and the energy emitted during the measuring time period).

According to a further variant of the invention, the heating means is provided as a resistance heating conductor. Particularly, this resistance heating conductor can consist of a layer of ceramic material which is electrically conductive. If the inventive method is used for controlling the temperature of a heater roller, the heating means is an electrically conductive layer arranged around the carrier roller. Preferably, for thermal insulation from the carrier roller, the thermal insulation layer is arranged between the electrically conductive heating layer and the carrier roller. The outer periphery of the heating layer is generally surrounded by a layer of an elastic material, particularly of a silicone rubber.

If the heating means to be temperature-controlled according to the method of the invention is powered by electric current, it is most suitable to use the battery voltage and the operating current as the operating parameters from which the actual temperature is derived. These two operational values allow conclusions on the amount of energy supplied to the heating means. Provided that the transmission behavior of the heating means between the supplied (electric) energy and the emitted (thermal) energy is known, the starting temperature of the heating means can be computed. If an electrically conductive resistance heating material is used for the heating means, detection of the temperature can be effected also by measuring the ohmic resistance.

Especially when using electrical resistance heating materials for a heating means, measuring the input quantity "current" (a temperature-dependent parameter) allows conclusions on the temperature if the interdependency between the temperature and the current is known. The other operating parameter of the heating means, i.e., the voltage prevailing on this resistance heating material, is constant and during operation of the heating means is always equal irrespective of the temperature. Thus, the driving of the resistance heating material, i.e., the application of the operating voltage, is equal for the length of the measuring time period and for the rest of the switch-on interval (if the latter is longer than the minimum length).

As already mentioned, the length of a switch-on interval is changed in dependence on the actual temperature, and specifically, this change is performed on the currently existing switch-on interval. For this purpose, the measuring time period and the switch-on interval will start simultaneously, i.e. the actual temperature will be detected in the first phase (measuring time period) of a switch-on interval. If the actual temperature is identical with the desired temperature (allowing a certain range of tolerances), the length of the current switch-on interval is selected to be equal to the length of the preceeding switch-on interval. If the actual temperature is higher than the desired temperature (or higher than said range of tolerances), the current switch-on interval is shortened on the other hand, if the actual temperature is lower than the desired temperature (or said range of tolerances), the current switch-on interval is prolonged.

Preferably, the change of the switch-on intervals, which succeed each other at equal distances, is performed in a step-wise fashion, provided that the result of the comparison between the actual temperature and the desired temperature requires such a change at all. This approach simplifies the driving of the heating means for changing the actual temperature.

In an electrical device operated by AC current and AC voltage, detection of the actual temperature is preferably carried out through integration of the time behavior of the operating current and the operating voltage over one half-wave, respectively. Therefore, in this case, the actual temperature is obtained on the basis of the area detection for a half-wave of the operating current and the operating voltage. Preferably, a respective AC/DC converter of a suitable design is used to scan the half-wave, with both of the AC/DC converters being connected to a computing unit calculating the resistance of the heater element from the digitized values of the half-wave time behavior of the operating current and the operating voltage. Preferably, each of the measured signals representing the operating current and the operating voltage is subjected to a half-wave rectification performed by diodes connected to ground.

BRIEF DESCRIPTION OF THE DRAWINGS

An embodiment of the invention will be explained in greater detail hereunder with reference to the accompanying drawings.

DETAILED DESCRIPTION OF THE PREFERRED EMBODIMENTS

Figure 1:
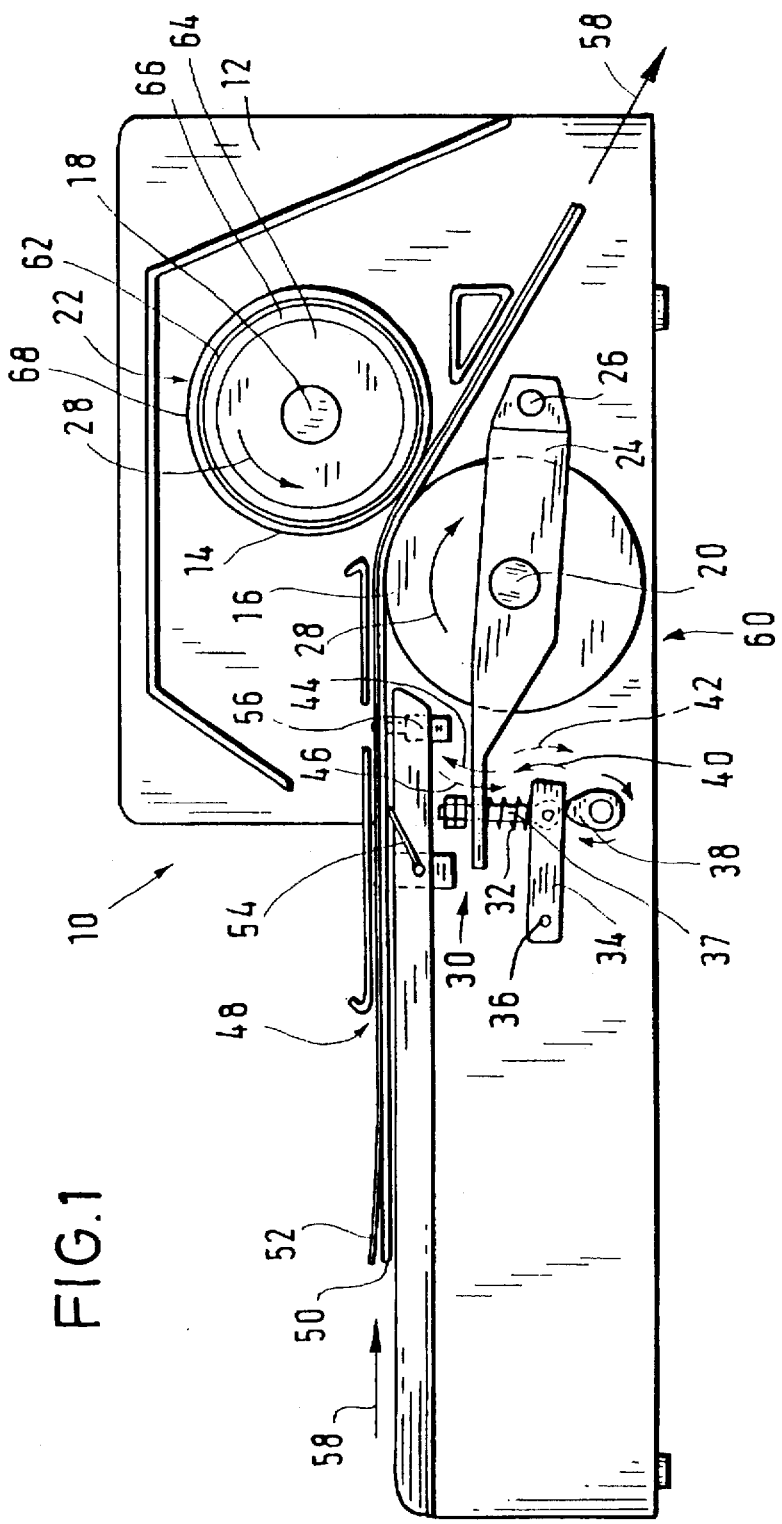
FIG. 1 is a side view of a laminating device for a color proofing system.

FIG. 1 is a side view of a laminating device 10 as used, e.g., for color proofing systems in the field of graphic reproduction and printing. Laminating device 10 is provided with a housing 12 which, among others, accommodates a pair of laminating rollers comprising an upper laminating roller 14 and a lower laminating roller 16. Both laminating rollers 14,16 are rotatable around parallel axes 18,20, with upper laminating roller 14 being supported on housing 12. Upper laminating roller 14 is provided with an (internal) heating means 22 serving for direct heating of upper laminating roller 14. In the present embodiment, lower laminating roller 16 is not provided with a heating means; however, it is of no relevance to the invention whether the lower laminating roller 16 comprises a heating means of its own, or whether—as will still be described—the lower laminating roller 16 is heated by contacting the heated upper laminating roller 14.

The rotational axis 20 of lower laminating roller 16 has its axial ends supported on respective pivot arms 24 which radially project beyond lower laminating roller 16 in outward direction and are mounted to be pivoted on housing 12. Said pivot arms 24 on housing 12 are pivotable about pivot axes 26 which in turn extend in parallel to the rotational axes 18,20 of laminating rollers 14,16. By pivoting the pivot arms 24, lower laminating roller 16 can be moved away from upper laminating roller 14 or be moved into engaging contact with upper laminating roller 14. Both laminating rollers 14,16 can be rotatably driven in the direction of arrows 28 by a chain drive (not shown).

The pivot arms 24, on their free ends 30 facing away from pivot axes 26, are engaged by compression springs 32 which are supported, on the one hand, on the free ends 30 of pivot arms 24 and, on the other hand, on pivotable levers 34. Said levers 34 are supported to be pivoted about pivoting axes 36 on housing 12, which in turn extend in parallel to pivot axes 26 and rotational axes 18,20. The levers 34 are further provided with pins 37 which have the compression springs 32 arranged therearound and which are guided through the free ends 30 of pivot arms 24 while being secured against undesirably sliding out of these free ends 30. The sides of levers 34 facing away from compression springs 32 are in engagement with the peripheral faces of cam members 38 which can be rotatably driven by a rotary drive (not shown). Upon rotation of cam members 38, levers 34 are pivoted in the direction of arrow 40 in FIG. 1 or—because of the free ends 30 of pivot arms 24 resting on levers 34—are pivoted in the direction of arrow 42, depending on the rotational position of cam members 38. When the pivoting movement is performed in the direction of arrow 40, pivot arms 24 are pivoted in the direction of arrow 44, and when levers 34 are pivoted back in the direction of arrow 42, pivot arms 24 are pivoted in the direction of arrow 46. Because of the mechanical coupling between respectively one lever 34 and the pivot arm 24 associated thereto, the laminating rollers 14, 16 are pressed against each other with a pressing force determined by compression springs 32 so that their peripheral surfaces are pressed against each other by a defined force.

The intermediate space between the two laminating rollers 14, 16 has a feed path 48 entering thereinto which serves for infeed of a proof 50 covered by a color particle layer 52. By the heating of proof 50 and color particle layer 52 and by the above pressing force, color particle layer 52, itself being held by a carrier film, is laminated onto proof 50. When the laminate applied on proof 50 and color particle layer 52 (including the carrier film) has left laminating device 10, the carrier layer can be pulled off so that the proof 50 will then carry only the color particle layer 52 which is to be exposed subsequently. Within feed path 48, a sensor 54 and a stopper means 56 are provided. Sensor 54, which in the transport direction 58 is arranged before stopper means 56, detects whether or not a proof 50 to be laminated is supplied. Stopper means 56 is provided to prevent infeed of proof 50 into the space between the two laminating rollers 14,16 in those phases in which both laminating rollers 14,16 are in mutual contact for tempering the lower laminating roller 16 which is not directly heated by heating means 22.

Heating means 22 of laminating roller 14 is provided as an electrically operated resistance heating layer 62 comprising an electrically conductive ceramic material having a negative or positive temperature coefficient. Said heating element 62 forms a layer surrounding a carrier roller 64, with a terminal insulation layer 66 arranged between heating layer 62 and the peripheral surface of carrier roller 64. A layer 66 of an elastic silicone rubber material 68 is arranged around the outer periphery of heating layer 62. Heating element 62 is electrically contacted by suitable means to allow an operating voltage to be applied to heating element 62 of laminating roller 14 between the two axial ends of roller 14.

Figure 2:
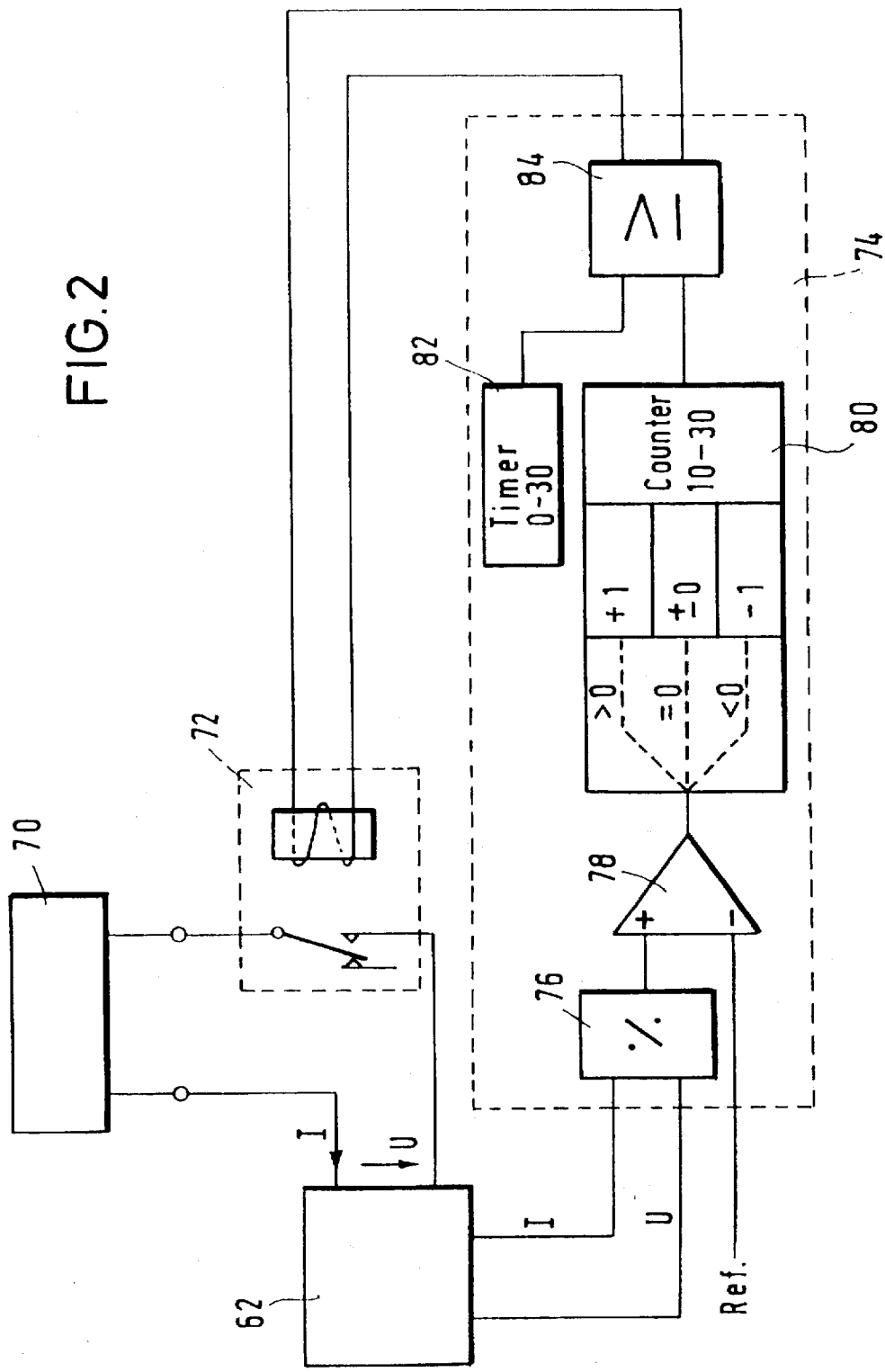
FIG. 2 is a block diagram illustrating the circuit for temperature control.

With reference to FIG. 2, the circuit for controlling the temperature of heating element 62 which for illustrational purposes is shown as a block, will be explained in greater detail. Heating element 62 is connected to an energy supply unit 70. A relais 72 for switch-on and switch off of heating element 62 is connected between energy supply unit 70 and heating element 62. The operating current I and the operating voltage U are used as the operating parameters representing the operational condition of heating element 62. These values are inputted into an evaluation circuit 74 together with a reference value. The output of evaluation circuit 74 is connected to relais 72 for driving same.

Evaluation circuit 74 is provided with a dividing means 76 for dividing the operating voltage by the operating current. The output signal of dividing means 76 and the reference signal are supplied to a comparator 78 for detecting whether the output signal of dividing means 76 and the reference signal are equal or not equal to each other (allowing a certain range of tolerances). The output of comparator 78 is connected to a counter unit 80 wherein the count can be set in dependence on the output signal of comparator 78. In the present case, the count can be set between the values 10 and 30 for reasons to be still explained below. The current count of counter unit 80 is left unchanged if the output signal of comparator 78 indicates that the two signals to be compared are equal to each other. The current count of counter unit 80 is increased by 1 if the output signal of comparator 78 indicates that the output signal of dividing means 76 is smaller than the reference signal. The count of counter unit 80 is decreased by 1 if the output signal of dividing means 76 is larger than the reference signal.

The count of counter unit 80, which—if required—has been changed in the above manner, is supplied to a comparator unit 84 together with the output signal of a timer 82. Comparator unit 84, forming the output unit of evaluation circuit 74, emits an output signal for that time period in which the output signal of timer 82 is smaller than or equal to the count of counter unit 80. Timer 82 counts continuously from 0 to 30, i.e., when reaching a count of 30, timer 82 is reset and again starts to count up from 0.

In the circuit illustrated in FIG. 2, the actual resistance—instead of the actual temperature of heating element 62 is detected and compared to a reference resistance value which corresponds to a predetermined desired temperature. Timer 82 emits an output signal for a time period between 0 and 30 time units (e.g., seconds). Counter unit 80 counts from 0 up to a count between a minimum value (not equal to 0) and a maximum value (equal to the number of time units counted by the timer) and then prevents the outputting of an output signal. Evaluation circuit 74 is triggered, namely with a period of 30 time units, so that, at each point of time 0, the dividing means 76 will perform the above division and the comparator 78 will perform the above comparison, and timer 82 and counter unit 80 will start running and counting, respectively. As long as an output signal is present both on the output of timer 82 and on the output of counter unit 80, relais 72 is driven by comparator unit 84 so that heating element 62 is in the switched-on condition. From the time the count of counter unit 80 has been reached until the lapse of the maximum period of 30 time units (e.g., 30 seconds), relais 72 is not driven so that heating element 62 is switched off.

Figure 3:
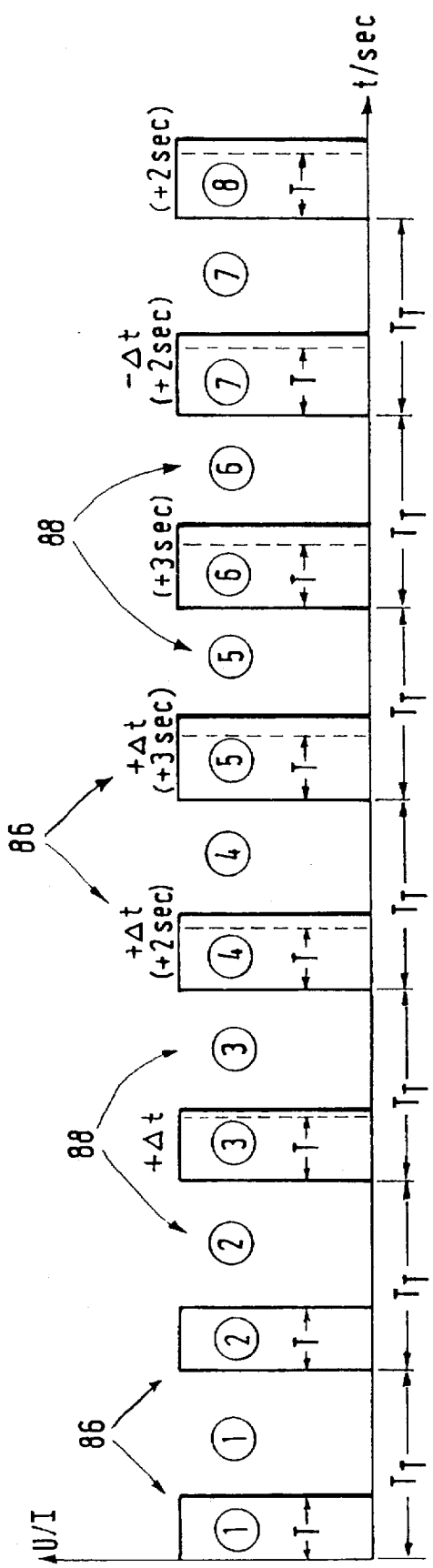
FIG. 3 is a diagram illustrating the time behavior of the operating current and the operating voltage, respectively, over a plurality of switch-on and switch-off intervals.

FIG. 3 illustrates the switch-on intervals 86 during which the predetermined (constant) operating voltage is applied to heating element 62 and the operating current I, having its amount set corresponding to the temperature of heating element 62, flows through heating element 62. The minimum period for the switch-on intervals 86 corresponds to that time which is required for concluding the detection of the actual temperature or the detection of the value of the actual resistance which is representative thereof. In the instant example, this period is assumed to be 10 time units (seconds). This means that the count of counter unit 80 has at least reached the value 10. In FIG. 3, the time behavior of the operating current and the operating voltage is illustrated in the transient state of the heating means and the laminating device. During the first two switch-on intervals 86, the actual temperature is equal to the desired temperature. It is to be noted that the electric energy supplied in the first switch-on interval shown on the extreme left in FIG. 3 has such an amount that heating element 62 will have cooled down in the subsequent switch-off interval 88 to such a low value that, also in the next switch-on interval 86, there will still be no reason for extending this interval 86. In the example illustrated in FIG. 3, it is then detected in the third switch-on interval 86 that the actual temperature is lower than the desired temperature. Therefore, the count of counter unit 80 is increased by 1. As a result, the period of the third switch-on interval 86 is increased by one second in comparison to the previous, second switch-on interval 86, which is illustrated in FIG. 3. In the present example, the actual temperature in the next (fourth) switch-on interval 86 continues to be smaller than the desired temperature, so that the count of counter unit 80 is again increased by 1, which adds up to a total increase by 2 as compared to the second switch-on interval 86. In the diagram of FIG. 3, the count is then increased once again by 1 in the fifth switch-on interval 86, and the count of counter unit 80 remains unchanged in the sixth switch-on interval 86. In the seventh switch-on interval 86, it is detected that the actual temperature is higher than the desired temperature, so that the count of counter unit 80 is decreased by 1. Finally, in the eighth switch-on interval 86, it is detected that the actual temperature is equal to the desired temperature, so that the count of counter unit 80 remains unchanged.

As evident from the above description, the actual temperature (or a value representative thereof is detected at the beginning of each switch-on interval 86 during a measuring time period (designated by T in FIG. 3). In this regard, it is decisive that the measuring time period T forms part of the switch-on interval 86 and influences the switch-on interval 86 as to its minimum length. The length of the measuring time period T is subject to the demands of measurement technology. It must always be assured that, in the subsequent switch-of f interval and—at the latest—by the beginning of the next switch-on interval, the electric energy which has been supplied in the measuring time period will be emitted again from the heating element as thermal energy. Otherwise, an undesired increase of the actual temperature of heating element 62 would occur in those phases in which the heating element 62 is not required to emit more energy than is led off by normal thermal radiation and convexion. (In the presently described laminating device, this is normally the case when the laminating device is at a standstill for a longer time period without performing a laminating process).

The inventive temperature control method offers the advantage that no separate measuring sensor is needed. Further, the drive circuitry used for the measuring time periods is relatively simple because the measuring time period is considered as being included in the switch-on interval and because the measuring of the actual temperature is based directly on the operating parameters (operating current and operating voltage).

Figure 4:
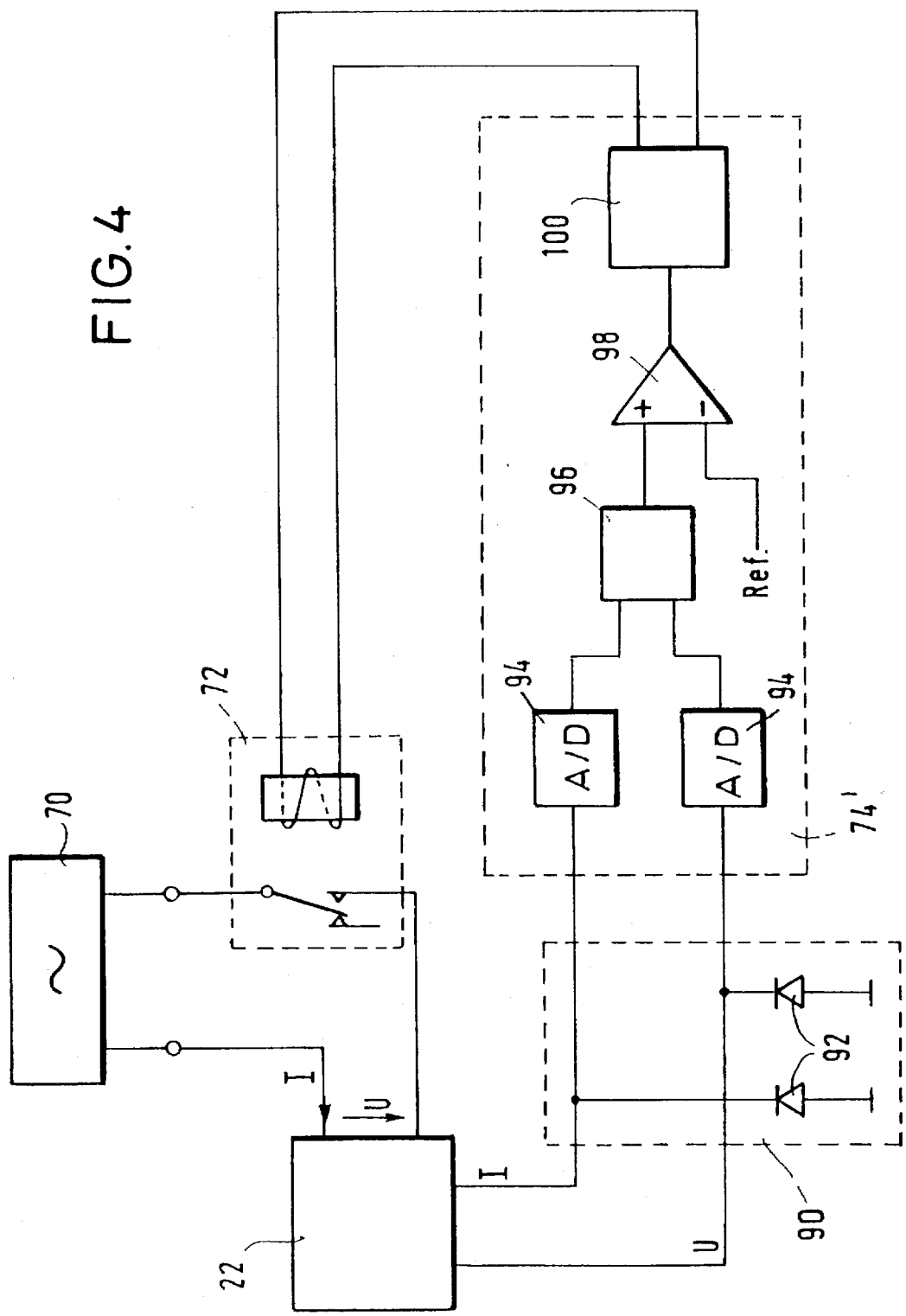
FIG. 4 is a block diagram illustrating the detection of the actual temperature through area computation of the time behavior of the operating current and the operating voltage over a half-wave.

FIG. 4 shows a block diagram of an alternative variant of the temperature control circuit. The difference from the circuit shown in FIG. 2 resides in the evaluation circuit 74' and in the processing of the measured signals for the operating parameters (operating current and operating voltage). Whenever possible, identical components are designated by the same reference numerals in FIGS. 2 and 4.

Figure 5:
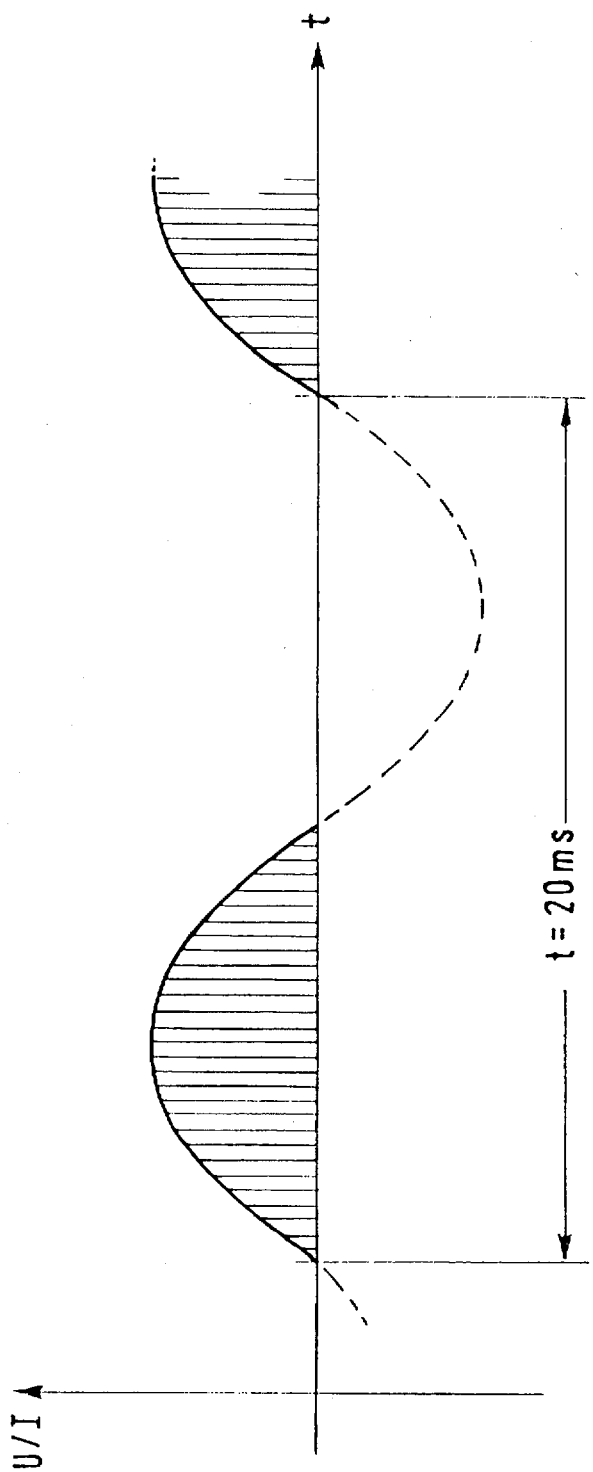
FIG. 5 is a diagram illustrating the scanning of a half-wave of the operating current and the operating voltage, respectively.

The operating voltage U and the operating current I are measured either directly or by sensors, and the measured signals are rectified in a half-wave rectifying device 90. Half-wave rectifying device 90 is provided, for each measured signal, with a diode 92 connected to ground. The half-wave measured signals for the operating current I and the operating voltage U are each supplied to a respective A/D converter 94, said A/D converters 94 being provided at the input of evaluation circuit 741. Each A/D converter performs a plurality of scans per half-wave (e.g., 128 or 256 with a scanning period length of 20 msec; of FIG. 5). Thus, for each scanning period, scanning is always performed on a full half-wave of the operating current and the operating voltage. The maximum values of these half-wave variations represent the present operating current and the present operating voltage. The digitized values of the halfwaves are inputted into a computing unit 96 which computes the respective maximum values and therefrom—by division—the electrical resistance and, from this resistance and on the basis of the dependence of the temperature from the resistance, computes the actual temperature of heating element 62 or a value representing this temperature. This approach can be used with sufficient accuracy in heating means wherein the temperature is subjected to only slight changes, i.e. is substantially uniform. The output signal of computing unit 96 is supplied to a comparator 98 together with a reference value for the desired temperature. In a similar manner as the comparator 78 shown in FIG. 2, comparator 98 produces an output signal indicating whether the output signal of computing unit 96 is larger or smaller than the reference value or equal thereto (allowing a range of tolerances). Then, as already explained in connection with FIG. 2, a circuit 100 connected to the output of comparator 98 generates the driving signal for relais 72 to switch the heating element into the on- or off-state. Alternatively, instead of detecting a maximum value, the computing unit 96 can perform separate integration processes for the operating current and the operating voltage over a halfwave and then, by dividing both integrals, the resistance and thus the actual temperature.

We claim:

1. A method for controlling the actual temperature of a heating means comprising the steps of:
   activating a heating means for a switch-on interval having a duration of a first number of time units;
   measuring at least one operating parameter for a predetermined measuring time period;
   comparing the actual temperature of the heating means to a desired temperature using the measured operating parameter;
   increasing the first number of time units if the actual temperature of the heating means is below the desired temperature, thereby lengthening the switch-on interval;
   decreasing the first number of time units if the actual temperature of the heating means is above the desired temperature, thereby shortening the switch-on interval; and
   deactivating the heating means for a switch-off interval having a duration of a second number of time units.

2. The method of claim 1 wherein the increasing step comprises the step of incrementing the first number of time units if the actual temperature of the heating means is below the desired temperature, thereby lengthening the switch-on interval by one time unit, and further wherein the decreasing step comprises the step of decrementing the first number of time units if the actual temperature of the heating means is above the desired temperature, thereby shortening the switch-on interval by one time unit.

3. The method of claim 1 wherein the deactivating step comprises the step of setting the second number of time units such that the sum of said first number of time units and said second number of time units equals a fixed predetermined period.

4. The method of claim 1 wherein: the measuring step comprises the steps of:
   measuring an operating voltage prevailing on the heating means, and
   measuring an operating current flowing through the heating means; and wherein the comparing step comprises the steps of:
   calculating an actual electrical resistance of the heating means as a function of the operating voltage and the operating current, and
   comparing the actual electrical resistance of the heating means to a desired electrical resistance corresponding to the desired temperature.

5. The method of claim 4 wherein: the step of measuring the operating voltage comprises the steps of:
   half-wave rectifying the operating voltage, and
   generating a digital representation of the rectified operating voltage by a first analog-to-digital converter; and wherein the step of measuring the operating current comprises the steps of:
   half-wave rectifying the operating current, and
   generating a digital representation of the rectified operating current by a second analog-to-digital converter.

6. The method of claim 1 wherein thermal energy supplied to the heating means during the measuring step is inferior to thermal energy emitted by the heating means during the deactivating step, and further wherein the decreasing step prevents overheating of the heating means by decreasing the first number of time units such that switch-on interval is equal to the predetermined measuring time period.

7. A laminating device comprising:
   a first laminating roller having an internal heating means;
   a second laminating roller adapted to engage the first laminating roller;
   an energy supply;
   a switch electrically coupling the energy supply and the heating means; and
   an evaluation circuit for activating and deactivating the energy supply by cycling the switch through successive switch-on intervals and switch-off intervals, the evaluation circuit measuring at least one operating parameter of the heating means in order to determine an actual temperature of the heating means and adjusting the length of the switch-on interval according to the actual temperature of the heating means.

8. The laminating device of claim 7 wherein the evaluation circuit comprises:
   a divider circuit receiving an operating voltage and an operating current of the heating means, the evaluation circuit calculating an actual electrical resistance of the heating means as a function of the operating voltage and the operating current;

a first comparator for comparing the actual electrical resistance of the heating means to a desired electrical resistance corresponding to the desired temperature;

a counter coupled to the first comparator, the counter defining the switch-on interval to have a duration of a first number of time units, the counter increasing the first number of time units if the actual temperature of the heating means is below the desired temperature, thereby lengthening the switch-on interval, and decreasing the first number of time units if the actual temperature of the heating means is above the desired temperature, thereby shortening the switch-on interval;

a timer for defining the switch-off interval to have a second number of time units; and a second comparator connected to the counter and the timer, the second comparator activating the heating means during the switch-on interval and deactivating the heating means during the switch-off interval.

9. The laminating device of claim 7 further comprising a rectifying device connected between the evaluation circuit and the heating means, the rectifying device half-wave rectifying an operating voltage and an operating current received from the heating means, and further wherein the evaluation circuit receives the rectified operating voltage and the rectified operating current, and wherein the evaluation circuit comprises:

a first analog-to-digital converter for converting the rectified operating voltage to a digital representation;

a second analog-to-digital converter for converting the rectified operating current to a digital representation;

a divider circuit for calculating an actual electrical resistance of the heating means as a function of the digital representation of the operating voltage and the digital representation of the operating current;

a first comparator for comparing the actual electrical resistance of the heating means to a desired electrical resistance corresponding to the desired temperature;

a driving circuit coupled to the first comparator, the driving circuit activating the heating means during the switch-on interval and deactivating the heating means during the switch-off interval.

* * * * *